Sept. 5, 1961  R. PIRRO  2,998,686
APPARATUS FOR THE CLOSURE UNDER HIGH VACUUM
OF GLASS BOTTLES AND SMALL BOTTLES
Filed May 19, 1958
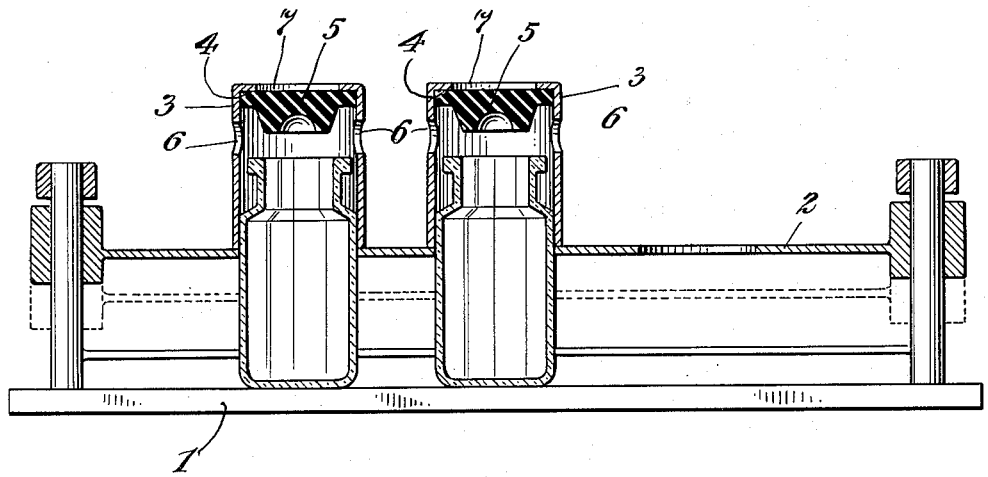
INVENTOR
*Raffaele Pirro*
BY
*his* ATTORNEY

United States Patent Office 2,998,686
Patented Sept. 5, 1961

2,998,686
APPARATUS FOR THE CLOSURE UNDER HIGH VACUUM OF GLASS BOTTLES AND SMALL BOTTLES
Raffaele Pirro, 11 Via Don Minzoni Sesto S. Giovanni, Milan, Italy
Filed May 19, 1958, Ser. No. 736,380
Claims priority, application Italy Jan. 10, 1957
1 Claim. (Cl. 53—101)

In the manufacture of pharmaceutical products, serums and vaccines a large use is made of glass bottles and vials, usually of a cylindrical shape, provided with a rubber plug. Said bottles suit very well, particularly for preparations to be inoculated, since, at the moment of the use, the rubber plug can be pierced by means of the syringe needle, allowing the preparation to be extracted under aseptic conditions. A further advantage given by the said small bottles consists in their easy handling during the preparation steps of the pharmaceutical products, particularly when the dehydration under high vacuum or freeze-drying is included therein. The dehydrated or freeze-dried preparations get a very good advantage if they are preserved in an airless room, since their high dehydration is thereby retained and all oxydation reactions which may take place during the preservation period are avoided.

The present invention relates to a mechanical apparatus which is able to easily and safely close any number of small bottles having been placed into a high vacuum chamber or a freeze-drying apparatus.

Said result is obtained by using conventional plugs and small bottles, without any special conformation of either. The small bottles can be plugged immediately upon receipt of the load of product to be preserved; they are then placed into the hereinafter described apparatus which removes the plugs therefrom inside the vacuum chamber and allows the air evacuation and the eventual dehydration or freeze-drying steps to take place. At the end the apparatus closes all small bottles, maintaining therein the high vacuum condition even when air is replaced into the apparatus so that the finished product can be extracted. These possibilities constitute an advantageous improvement in the technique of preparation of different products. Moreover the asepsis is easily maintained, owing to the possibility of closing the bottles by their rubber plug immediately after dosing. The apparatus according to the present invention and diagrammatically represented in FIGURE 1 consists of a bottle-holding small basket formed by a flat bottom 1, usually of stainless metal sheet with a superposed further sheet 2 provided with a number of holes which is equal to the number of small bottles to be carried. The diameter of said holes is such that the small bottles can freely pass therethrough, but without undue clearance. A tolerance of 0.5 mm. was found very suitable. The small bottles to be treated after passing through the holes rest on the lower sheet and remain perfectly arranged. On each small bottle provision is made of a metal sleeve 3 which is provided with a seat 4 wherein the plug is forced (so that upon raising the sleeve 3 the plug too is raised) and with one or more lateral holes 6 at the upper side for the outlet of the vapours of the product being dried. The sleeve 3 is guided by the body itself of the small bottle and can therefore vertically move whilst still remaining perfectly centered and retaining the plug exactly centered in respect of the orifice of the small bottle when it is lowered. The punched sheet 2 is movable vertically for a short stroke, for instance 10 or 20 mm.; when it is raised, all sleeves 3 placed on the small bottles are obliged to rise, thus raising the rubber plugs 5; when it is lowered, the sleeves go down and allow the plugs to fit into the orifices of the small bottles. The stroke of the punched sheet 2 is so provided that at the upper end the plugs are sufficiently clear of the small bottles, whilst at the lower end the sleeves are left completely free to weigh down on the plugs, so that the latter are pressed on the small bottle orifices. The raising of sheet 2 can be carried out by hand (when the small basket is not under vacuum) or by mechanical or electric means. The downstroke is carried out upon release of the stop means provided on the raised position, by an electro-magnetic or mechanical drive.

According to the present invention, the above described apparatus works as follows: the small bottles closed by rubber plug immediately upon receipt of their quantity of product are provided with the sleeve (which is frictionally blocked on the rubber plug) and are then placed on the small basket; when the latter is full, the punched sheet is manually raised thereby raising also all sleeves; the friction exerted by each plug against its small bottle does not enable it to be detached therefrom and consequently also the small bottles are raised and remain suspended. Under these conditions the small basket is placed into the vacuum chamber; upon establishing the vacuum condition, the air contained in the small bottles exerts a thrust which detaches the plugs from the small bottles so that they fall in contact with the bottom 1 whilst still remaining centered by the holes of sheet 2, wherein they are accommodated and can slide vertically. All small bottles, which have been plugged at the beginning, are thus opened in the aseptic room under vacuum. Any step of simple evacuation, dehydration or freeze-drying can now be carried out. At the end, by a drive from outside, sheet 2 is released from the stop means which retained it in a raised position, and falls down, thus enabling the sleeve 3 to go down until they bear the rubber plugs against the small bottle orifices. The plugs, however, can not completely enter the said orifices owing to the friction; but they give nevertheless a good air tightness, due to the perfect centering and to the weight of the sleeve solid herewith. When the vacuum condition is interrupted, the outside pressure forces the plugs to suitably enter the small bottle necks thereby effecting the final closure. This final step is carried out under perfect aseptic conditions as regards the inside of the small bottles. The small basket can now be extracted from the vacuum chamber and the small bottles are released from the sleeves by a very easy manual operation. The tops of the sleeves 3 are provided with holes 7 of circular or other shape through which pressure may be exerted on the plug 5 to remove the vial from the sleeve 3 after completion of the work cycle. Inside the small bottle the high vacuum condition established in the apparatus is still maintained. All thrusts for removing and replacing the plugs from and into the small bottles in the vacuum chamber are ensured by the clearances of the air pressure and consequently the hereinbefore described apparatus has no practical limits in its efficiency: it is even possible to treat normally and without any difficulty some thousands of small bottles at the same time.

What I claim is:

In a device for sealing the opening of a plurality of bottles with a plurality of respective plugs, in combination, a support plate for supporting bottles; a perforated plate substantially parallel to and located above said support plate and formed with a plurality of openings therein for passage therethrough of bottles supported on said support plate; a plurality of plug holders resting on said perforated plate and corresponding respectively to said plurality of openings in said perforated plate, each plug holder having a guide portion for aligning said plug holder with a bottle passing through a respective opening, an abutment portion facing the corresponding opening of said perforated plate and said support plate, and a holding portion for frictionally holding a plug in abutment against said abutment portion; and means for moving said perforated plate to a higher position farther spaced from said support plate with the plugs located in the bottles and the bottles spaced from said support plate so that the bottles will separate from the plugs in a vacuum and fall onto said support plate while guided by said openings, and for moving said perforated plate to a lower position closer spaced from said support plate to permit said plug holders to press the plugs into the bottles.

References Cited in the file of this patent

UNITED STATES PATENTS

| | | |
|---|---|---|
| 2,353,985 | Barr | July 18, 1944 |
| 2,494,541 | Burr et al. | Jan. 17, 1950 |
| 2,684,777 | Danzin et al. | July 27, 1954 |
| 2,700,487 | Hall | Jan. 25, 1955 |
| 2,714,980 | Schlayer et al. | Aug. 9, 1955 |
| 2,849,848 | Raun | Sept. 2, 1958 |
| 2,881,576 | Nebinger | Apr. 14, 1959 |